United States Patent [19]

Jeuch et al.

[11] Patent Number: 5,528,221
[45] Date of Patent: Jun. 18, 1996

[54] AUTOMATIC IDENTIFICATION SYSTEM FOR OBJECTS OR PERSONS BY REMOTE INTERROGATION

[75] Inventors: Pierre Jeuch, Seyssins; Alain Le Roy, Meylan, both of France

[73] Assignee: Commissariat a l'Energie Atomique, Paris, France

[21] Appl. No.: 150,040

[22] PCT Filed: May 26, 1992

[86] PCT No.: PCT/FR92/00469

§ 371 Date: Nov. 16, 1993

§ 102(e) Date: Nov. 16, 1993

[87] PCT Pub. No.: WO92/22040

PCT Pub. Date: Oct. 12, 1992

[30] Foreign Application Priority Data

May 28, 1991 [FR] France .................................. 91 06399

[51] Int. Cl.⁶ .................................................. G08B 13/14
[52] U.S. Cl. ........................................ 340/572; 340/825.54
[58] Field of Search ............................... 340/572, 551, 340/505, 825.54, 825.34; 364/403; 235/385

[56] References Cited

U.S. PATENT DOCUMENTS

| 4,471,345 | 9/1984 | Barrett, Jr. ............................. 340/572 |
| 4,862,160 | 8/1989 | Ekchian et al. ..................... 340/825.54 |
| 4,924,210 | 5/1990 | Matsui et al. .......................... 340/572 |
| 5,124,699 | 6/1992 | Tervoert et al. ................... 340/825.54 |

FOREIGN PATENT DOCUMENTS

| 0161779 | 11/1985 | European Pat. Off. . |
| 0285419 | 10/1988 | European Pat. Off. . |
| 59-57348 | 4/1984 | Japan . |
| 2116808 | 9/1983 | United Kingdom . |
| 9222040 | 12/1992 | WIPO . |

OTHER PUBLICATIONS

European Search Report—PCT/FR 92/00469—SA 60117—Aug. 3, 1993.

*Primary Examiner*—Brent A. Swarthout
*Assistant Examiner*—Thomas J. Mullen, Jr.
*Attorney, Agent, or Firm*—Pearne, Gordon, McCoy & Granger

[57] ABSTRACT

Automatic identification system for objects or persons by remote interrogation. The invention relates to an interrogating E/R (emitter/receiver) or gate associated with an answering E/R or tag having a digitized code identifying the same. The gate supplies four information types in the form of signals to the tags which answer "yes" or, by an absence of any answer, "no" until the gate has found their codes. When its code has been found, the tag is inhibited, thus permitting the detection of other codes. The invention more particularly applies to the monitoring of persons carrying answering E/Rs or to the billing of goods on sale in a large surface area.

10 Claims, 8 Drawing Sheets

| GATE ACTION | E1 ANSWER | E2 ANSWER | E3 ANSWER | INTERPRETATION |
|---|---|---|---|---|
| SEQUENCE START EMISSION | | | | START |
| TYPE 0 INFORMATION EMISSION | NO ANSWER (BIT NO. 1 = 0) | NO ANSWER (BIT NO. 1 = 0) | NO ANSWER (BIT NO. 1 = 0) | ALL TAGS HAVE BIT NO. 1 AT 0 |
| TYPE 0 INFORMATION EMISSION | EMISSION (BIT NO. 2 = 1) | EMISSION (BIT NO. 2 = 1) | EMISSION (BIT NO. 2 = 0) | AT LEASE 1 TAG HAS A BIT NO. 2 AT 1 |
| TYPE 1 INFORMATION EMISSION | EMISSION (BIT NO. 3 = 1) | EMISSION (BIT NO. 3 = 0) | PASSAGE TO INSTANTANEOUS INHIBITION MODE | AT LEAST 1 TAG HAS A BIT NO. 3 AT 1 |
| TYPE 1 INFORMATION EMISSION | NO ANSWER (BIT NO. 4 = 0) | PASSAGE TO INSTANTANEOUS INHIBITION MODE | | STILL ACTIVE TAGS HAVE THEIR BIT NO. 4 AT 0 |
| TYPE 0 INFORMATION EMISSION | NO ANSWER (BIT NO. 5 = 0) | | | FIRST CODE FOUND |
| TYPE 0 INFORMATION EMISSION | PASSAGE TO INSTANTANEOUS INHIBITION MODE | END OF INHIBITION | END OF INHIBITION | START OF SEARCH FOR FOLLOWING CODE |

Fig.6A

| | | | |
|---|---|---|---|
| SEQUENCE START EMISSION | | | |
| TYPE 0 INFORMATION EMISSION | NO ANSWER (BIT NO. 1 = 0) | NO ANSWER (BIT NO. 1 = 0) | ALL TAGS HAVE BIT NO. 1 AT 0 |
| TYPE 1 INFORMATION EMISSION | EMISSION (BIT NO. 2 = 1) | NO ANSWER (BIT NO. 2 = 0) | AT LEASE 1 TAG HAS A BIT NO. 2 AT 1 |
| TYPE 0 INFORMATION EMISSION | NO ANSWER (BIT NO. 3 = 0) | PASSAGE TO INSTANTANEOUS INHIBITION MODE | ALL REMAINING TAGS HAVE BIT NO. 3 = 0 |
| TYPE 1 INFORMATION EMISSION | EMISSION (BIT NO. 4 = 1) | | AT LEAST ONE TAG HAS BIT NO. 4 AT 1 |
| TYPE 1 INFORMATION EMISSION | NO ANSWER (BIT NO. 5 = 0) | | SECOND CODE FOUND |
| TYPE 0 INFORMATION EMISSION | PASSAGE TO DEFINITIVE INHIBITION MODE | END OF INHIBITION | START OF SEARCH FOR FOLLOWING CODE |

Fig.6B

| | | |
|---|---|---|
| SEQUENCE START EMISSION | | |
| TYPE 0 INFORMATION EMISSION | NO ANSWER (BIT NO. 1 = 0) | ALL TAGS HAVE THEIR BIT NO. 1 AT 0 |
| TYPE 0 INFORMATION EMISSION | NO ANSWER (BIT NO. 2 = 0) | ALL TAGS HAVE THEIR BIT NO. 2 AT 0 |
| TYPE 1 INFORMATION EMISSION | EMISSION (BIT NO. 3 = 1) | AT LEAST ONE TAG HAS BIT NO. 3 AT 1 |
| TYPE 1 INFORMATION EMISSION | EMISSION (BIT NO. 4 = 1) | AT LEAST ONE TAG HAS BIT NO. 4 AT 1 |
| TYPE 1 INFORMATION EMISSION | EMISSION (BIT NO. 5 = 1) | THIRD CODE FOUND |
| TYPE 1 INFORMATION EMISSION | PASSAGE TO DEFINITIVE INHIBITION MODE | START SEARCH FOR FOLLOWING CODE |
| SEQUENCE START EMISSION INFORMATION | | ALL REMAINING TAGS HAVE THEIR BIT 1 = 0 |
| TYPE 0 INFORMATION EMISSION | | ALL REMAINING TAGS HAVE THEIR BIT 2 = 0 |
| TYPE 0 INFORMATION EMISSION | | ALL REMAINING TAGS HAVE THEIR BIT 3 = 0 |
| TYPE 0 INFORMATION EMISSION | | ALL THE REMAINING TAGS HAVE THEIR BIT 4 = 0 |
| TYPE 0 INFORMATION EMISSION | | ALL TAGS WERE INHIBITED, END OF SEARCH, ALL CODES FOUND |

Fig.6C

# AUTOMATIC IDENTIFICATION SYSTEM FOR OBJECTS OR PERSONS BY REMOTE INTERROGATION

BACKGROUND OF THE INVENTION

The present invention relates to an automatic identification system for objects or persons by remote interrogation. It has numerous applications, particularly in the field of detecting persons carrying badges or in the accounting and/or checking of stocked goods or goods sold in stores.

In known automatic identification systems, it is possible to recognize an object or a person carrying respectively a tag or a badge provided with a code circuit and passing under or in the vicinity of a monitoring gate. This gate then emits RF (radio frequency) pulses towards the tag or badge. These pulses are used for energizing the tag and interrogating the code stored therein. The code of the tag or badge carried by the object or person is in this way recognized. Such a device is described in EP-A-241 148.

Such systems do not make it possible to recognize in a quasi-simultaneous manner a plurality of objects or persons by the successive determination of each bit constituting the code contained in the tag or badge of said objects or persons and therefore do not make it possible to process a large number of objects.

SUMMARY OF THE INVENTION

The object of the invention is to make it possible to detect and recognize in a quasi-simultaneous manner all the objects or persons in a group by simultaneously interrogating them and thus making it possible to process a large number of objects.

The invention consists of the emission of RF signals by a gate, said RF signals being questions to which the tags reply by a consent signal or by the absence of a signal, thus enabling the gate to determine the elements of codes contained in said group of objects. When a code has been found, the tag containing said code is inhibited in order to permit the detection of other codes.

Use will be made throughout the description and interchangeably of the terms tag, badge or answering E/R (emitter/receiver) means, as well as the terms gate or interrogating E/R (emitter/receiver) means.

In addition, throughout the description, the term "inhibit" will be understood to mean the passage into a silent or inactive mode, i.e. where a tag or answering means no longer reacts.

The invention more specifically relates to an automatic identification system for objects or persons by remote interrogation comprising:

interrogating E/R (emitter/receiver) means incorporating a device for emitting RF (radio frequency) signals having a modulator generating different wave shapes and a RF (radio frequency) signal reception device and answering E/R means having a circuit for receiving coded information coming from the interrogating E/R means and the emission of an answer, a supply device and storage means in which is stored a digitized code linked with each object or person, characterized in that:

said answering E/R means has at least one emitting/ receiving antenna forming part of said reception and emission circuit, a checking and sequencing circuit controlling all the signals necessary for a complete code search sequence and inhibiting means connected to said checking and sequencing circuit and able to inhibit the answering E/R means, and said interrogating E/R means being able to continuously emit a high frequency signal, control by processing means the tasks necessary for the search of the digitized codes delivered by the answering E/R means and store in a memory said digitized codes.

Advantageously, the inhibiting means comprise at least two flip-flops, the first flip-flop being a temporary inhibiting flip-flop able to inhibit the answering E/R means during a search sequence. The second flip-flop is a definitive inhibiting flip-flop ensuring the inhibition of the answering E/R means when the sought digitized code has been correctly received and stored by the interrogating E/R means.

These inhibiting means remain active for as long as the answering E/R means are energized. When the power supply is interrupted, the answering E/R means are again able to respond to a new interrogation sequence.

The digitized code also has an identification code of the object or person type, an optional random subcode ensuring the unitary identification of the person or object in question and optionally a check code for checking the good integrity of the transmitted information. These codes are not necessarily following one another and can instead be interleaved, particularly the check code, in order to check the validity of information transmitted during the interrogation.

According to a feature of the invention, the storage means of the answering E/R means comprise a code memory and an address counter able to indicate or select each element constituting the digitized code stored in the memory, said counter being connected to the checking and sequencing circuit by a "clock" connection for controlling the advance of the counter and a zeroing connection for indicating or selecting the first element of the digitized code.

According to the invention, the modulator of the interrogating E/R means generates at least two wave shapes combined together to form at least four coded information types.

The supply or energizing device comprises a circuit for recovering energy coming from the interrogating E/R means.

Advantageously, the processing means of the interrogating E/R means ensuring the control of the tasks necessary for the search of the digitized codes make it possible to perform the following stages:

a) transmitting a "start of search sequence" information corresponding to the interrogation of the first element of the digitized code, b) awaiting the answer supplied by the answering E/R means, c) storing in the memory of the interrogating E/R means a logic state corresponding to the element being processed of the digitized code and transmitting "type" information corresponding to the answer received in order to interrogate the following code element, d) return to stage b) up to the end of the search sequence when the final code element is identified, e) verification of the validity of the digitized code received, f) storage in said memory of the digitized code received when said received code is valid and rejection of the said digitized code in the opposite case with the transmission of a "sequence start and erroneous preceding code" information and return to stage b), and g) return to stage a) when the received code is valid in order to interrogate other codes until a zero code is obtained.

According to another feature of the invention, the checking and sequencing circuit of the answering E/R means makes it possible to perform the following stages:

a) reception of the "start of search sequence" pulse transmitted by the interrogating E/R means, b) zeroing the address counter of the storage means of the answering E/R means, c) temporary inhibiting of the answering E/R means or frequency emission up to the reception of the next coded information coming from the interrogating E/R means, as a function of the activity of the answering E/R means, the logic state of the code element being processed and the type of the last information received, activity being the opposite to inhibition, d) incrementation of the address counter of the code storage means and checking the value of said address with the passage to stage g) when said value corresponds to the final element of the processed code, e) reception of the information transmitted by the interrogating means corresponding to the answer emitted by the answering E/R means in the first stage c) or the reception of a start of sequence information, f) temporary inhibition of the answering E/R means up to the reception of a "start of search sequence" information coming from the interrogating E/R means in the case when the information received in c) by the interrogating E/R means is different from the information stored at the corresponding address in the memory of the answering E/R means or, in the opposite case, return to stage c), and g) definitive inhibition of the answering E/R means when the final element of the digitized code has been correctly transmitted or reactivation of said answering E/R means and return to stage b) in the opposite case.

The start of sequence information of stage e) can be received by the answering means as a result of a transmission fault. In addition, the number of elements of the code is N, said elements carrying the addresses from 0 to N−1.

In a preferred embodiment, the digitized code consists of a string of bits. Moreover, the interrogating E/R means have at least three emitting antennas, each connected upstream to an emitter, said antennas functioning in pairs, and at least three receiving antennas each connected to a receiver and a demodulator downstream of which a decision member generates a reception signal of at least one antenna.

According to the same final embodiment, the processing means of the interrogating E/R means ensuring the control of the tasks necessary for the search of the digitized codes make it possible to perform the following supplementary stages:

choice of an emission configuration consisting of choosing the emitting antennas to be combined with one another during the putting into operation of the identification system, change of emission configuration and resumption of the search sequence when the digitized code has not been correctly transmitted, storage of the digitized code when said code has been considered as erroneous for at least three different emission configurations, successive performance of all the search sequences linked with the different emission configurations in order to check the total inhibition of the answering E/R means.

By thus permitting the quasi-simultaneous detection of a large number of objects, the present invention consequently leads to a considerable time gain compared with the aforementioned, prior art devices.

Other advantages and features of the invention can be gathered from the following illustrative, but non-limitative description. As an example and for describing the invention, the case of goods provided with tags and grouped in a trolley which the customer passes under a detection gate will be used. In this example, the system according to the invention makes it possible to quasi-instantaneously determine and bill the goods collected in bulk within the said trolley.

BRIEF DESCRIPTION OF THE DRAWINGS

The description refers to the following drawings, wherein:

FIGS. 6A, 6B and 6C are a table showing examples of gate/tag dialog.

DETAILED DESCRIPTION OF THE PREFERRED EMBODIMENTS

Figure 1:
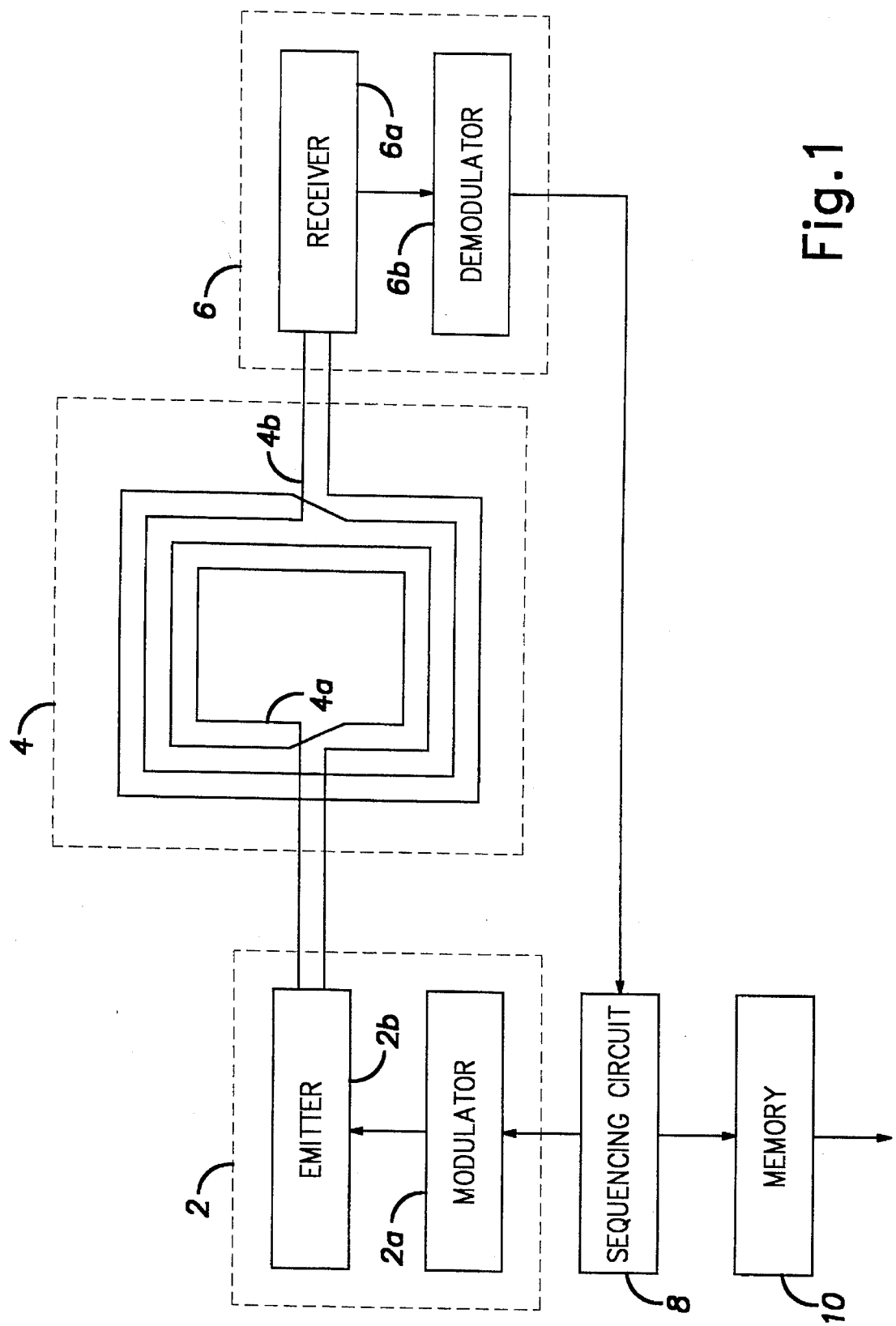
FIG. 1 diagrammatically shows the electronic circuit of the gate according to the invention.

FIG. 1 shows the electronic circuit of the gate, which is constituted by an emission system 2, an emitting/receiving antenna 4 and a reception system 6. Processing means such as a sequencing circuit 8 are responsible for the control of the emitted signals and the received signals.

In the embodiment shown in FIG. 1, the gate comprises two antennas, namely an emitting antenna 4a and a receiving antenna 4b, it being understood that the said gate can have one or more antennas able to ensure both emission and reception.

When a trolley carrying objects with tags arrives below the monitoring gate, the sequencing circuit 8 gives the order to modulate, by a modulator 2a, and then transmit, by an emitter 2b and the antenna 4a, an interrogation signal to the tags. This interrogation signal is advantageously constituted by two successively emitted bits, which phase or frequency modulate the signal continuously emitted by the emitter 2b to the gate antenna 4a. This signal can therefore assume four states having the following meanings: start of search sequence, type 1 information signifying that at least one still active tag had a code bit at 1 at the sought address during the preceding interrogation, type 0 information signifying that no still active tag had a code bit at 1 at the sought address during the preceding interrogation, start of search sequence, the previously received code not corresponding to a valid code.

The tags answer or respond by supplying an answer signal, which is intercepted by the antenna 4b and a receiver 6a and then demodulated by the demodulator 6b in order to be interpreted by the sequencing circuit 8.

Thus, the gate can determine the values of the different bits or elements of the codes of the objects in the trolley. When a complete code has been found, the corresponding tag is inhibited and the sequencing circuit 8 orders the recording of the code found in a memory 10. The memory is the link between the electronic circuit of the gate and a not shown data processing system which permits, in the chosen application, the finding of the wording and the price of each article by means of its digitized code and then produces the bill therefrom. The processing means 8 and memory 10 are advantageously constituted by a microprocessor.

Figure 2:
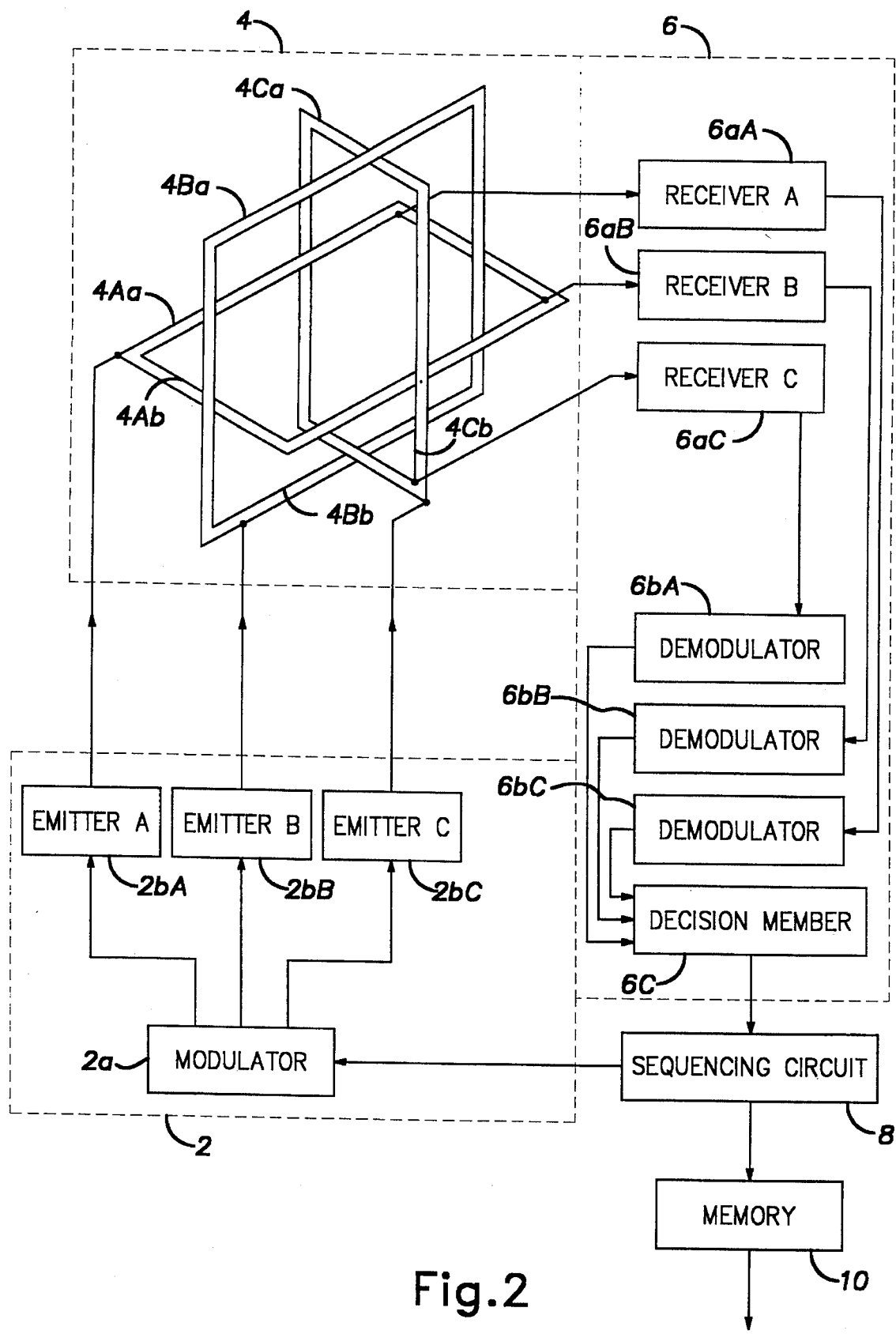
FIG. 2 shows the same circuit according to a preferred embodiment of the invention.

FIG. 2 shows the same electronic circuit according to a different embodiment. Thus, this embodiment has the advantage, compared with that of FIG. 1, of limiting the risk of poor coupling between the gate and the tags. For this purpose use is made of three emitting antennas 4A$a$, 4B$a$ and 4C$a$ and three receiving antennas 4A$b$, 4B$b$ and 4C$b$ orthogonal to one another.

The three receiving antennas 4A$b$, 4B$b$ and 4C$b$ are connected to three receivers 6$a$A, 6$a$B and 6$a$C and three demodulators 6$b$A, 6$b$B, 6$b$C, downstream of which there is a decision member 6$c$ generating the detection signal of the emission of one or more antennas 4A$b$, 4B$b$, 4C$b$. Thus, the decision member generates a detection signal when at least one of the three demodulators has detected an emission signal.

The three emitting antennas 4A$a$, 4B$a$ and 4C$a$ are connected to three emitters 2$b$A, 2$b$B and 2$b$C and operate in emission configurations of two antennas. The two operating antennas are energized by two signals in quadrature coming from the emitters. An emission configuration is chosen and retained for as long as informations are correctly transmitted. As soon as the transfer takes place incorrectly, another emission configuration is chosen. The components of FIG. 2, identical to their homologs of FIG. 1, operate in the same way and are not described again.

Figure 3:
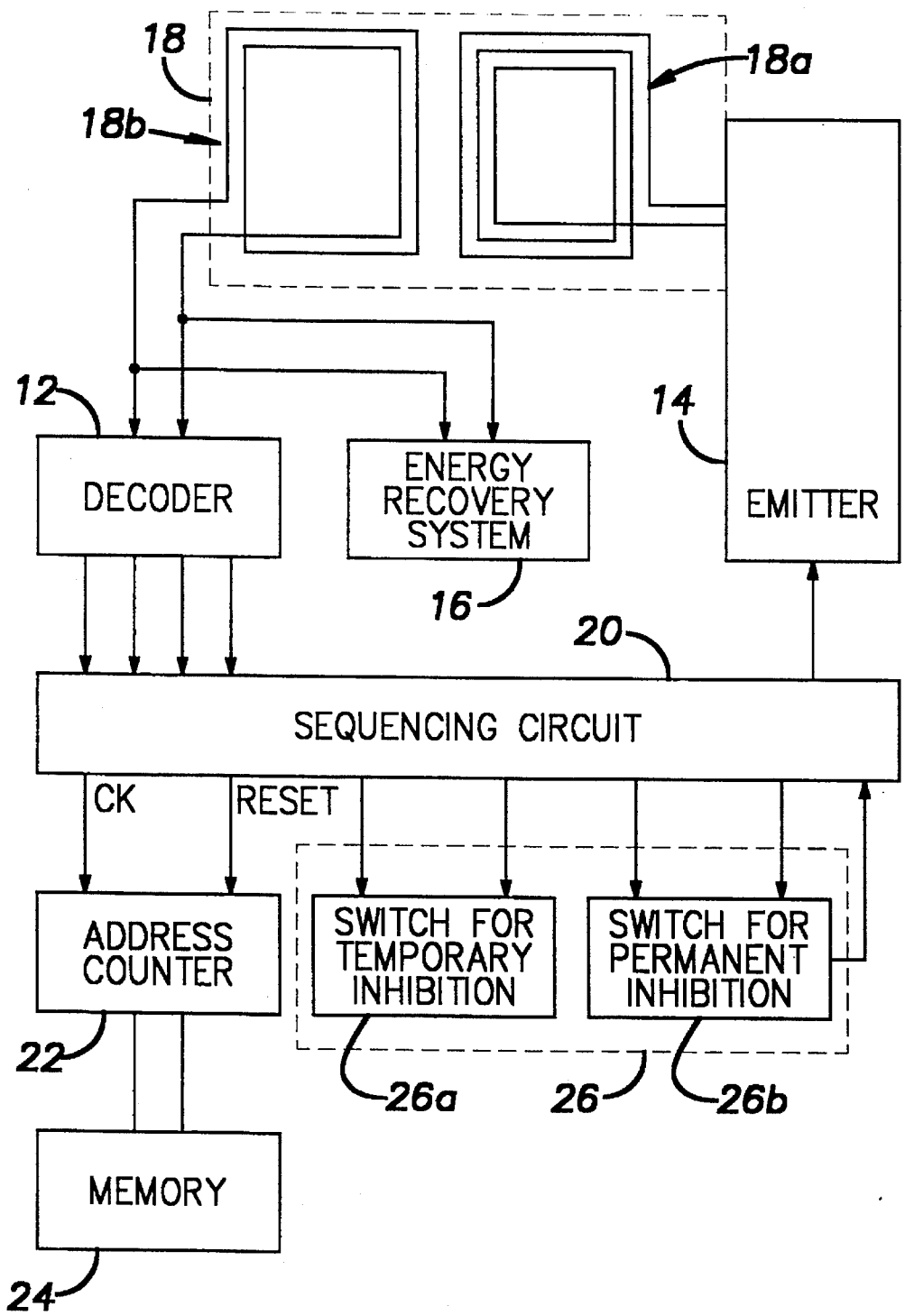
FIG. 3 diagrammatically shows the electronic circuit of a tag.

FIG. 3 diagrammatically shows the electronic circuit of a tag. It more particularly comprises a receiving/emitting antenna 18 and a microcircuit having a decoder system 12 for the reception of signals from the gate, a system 14 for emitting response or answer signals, a system 16 for recovering the energy from the gate, a checking and sequencing circuit 20, storage means 22,24 and inhibiting means 26. Advantageously, the system 16 is a rectifier bridge associated with a storage capacitor. In addition, this recovery system 16 is connected to the different elements of the answering means. The storage means incorporate an address counter 22 and a memory 24 and the inhibiting means are formed from flip-flops 26$a$,26$b$. The address counter 22 is connected to the sequencing circuit 20 by a clock input CK and a zeroing input RESET.

In the embodiment shown in FIG. 3, the tag comprises two antennas, namely an emitting antenna 18$a$ and a receiving antenna 18$b$. These antennas can either be directly produced on the microcircuit, or can be deposited on the printed circuit on which the microcircuit is placed.

The checking and sequencing circuit 20 makes it possible to control the information received and the information to be transmitted. This circuit 20 also increments the address counter 22 and ensures the operation of the inhibiting flip-flops 26. The code memory 24 containing the digitized tag code is connected at its input to the address counter 22 and at its output to the checking and sequencing circuit 20.

An interrogation signal transmitted by the gate is received by the receiving antenna 18$b$, decoded by the decoder 12 and the thus decoded information is transmitted to the checking and sequencing circuit 20, which controls and checks the information received. The sequencing circuit 20 decides on the answer to be transmitted, the incrementation of the address counter 22 and the passage of the tag into the inhibited mode. The answer to be emitted is then transmitted to the emitter 14, which delivers the answer signal to the gate. In parallel, the energy recuperating means 16 transforms the energy received from the gate into a supply voltage for the tag electronic circuit.

Figure 4:
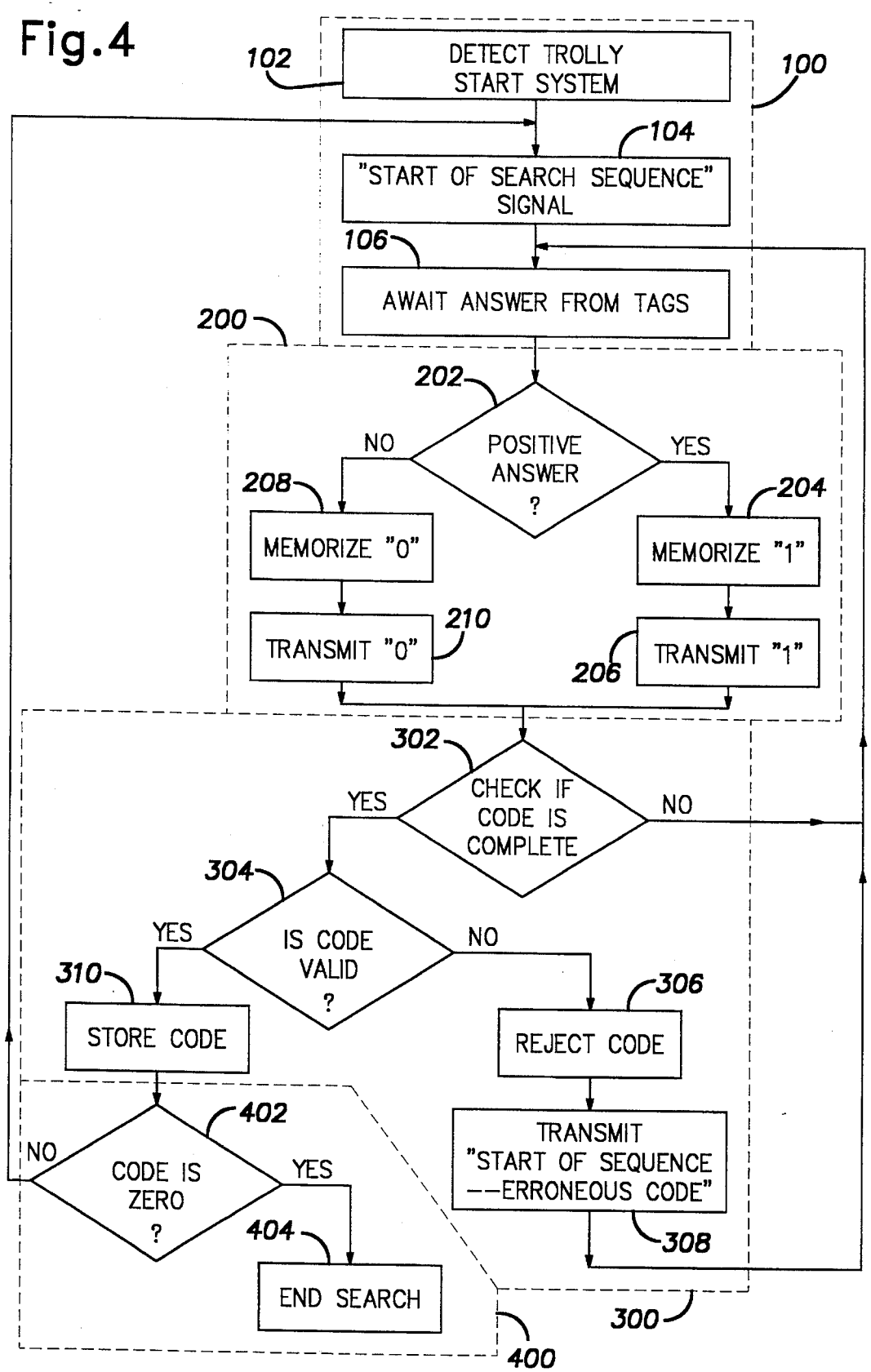
FIG. 4 shows the stages of the control of the tasks necessary for the search of the digitized codes.

FIG. 4 shows the control stages with regards to the tasks necessary for the search for the digitized codes, such as are used by the gate.

A first stage 100 consists of starting the search sequence. This search sequence for a code starts at 102 when the presence of a trolley is detected beneath the gate. This sequence can start automatically or by mechanical actuation. A "start of search sequence" signal 104 corresponding to the interrogation of the first code element is then supplied to the tags. At 106 the system awaits the answer from said tags.

A second, choice stage 200 is then initiated as a function of the answer received. The choice 202 takes place in the following way. If the answer received is positive, a 1 is stored 204 in the gate memory 10 and then a type 1 information 206 is transmitted to the tags. If the answer received is negative, a 0 is stored 208 in the memory 10 and a type 0 information 210 is transmitted.

A third stage 300 consists of checking 302 if the received code is complete. If the code is complete and valid 304, then said code is stored at 310 in the gate memory 10. If it is complete and erroneous, said code is rejected 306 and a "start of sequence–erroneous code" message 308 is transmitted as the answer at 106. When the received code is incomplete, the search sequence continues at 106.

A fourth stage 400 consists of the reception of the code following its storage. The code is checked 402. Then the code is zero, the search sequence ends in 404. When it is not zero, the search sequence continues with the transmission of a new "start of search sequence" signal at 104.

In the embodiment according to FIG. 2, a few supplementary stages are necessary. An antenna emission configuration is adopted during the first stage 100 and retained whilst the transfer of the codes takes place correctly. As soon as this transfer is no longer correct, the configuration is modified. However, if the same erroneous code is transferred with the three different emission configurations, the corresponding tag is assumed to be incorrectly programmed and the received code is assumed to be valid and the tag is then inhibited.

This embodiment of the invention permits a supplementary check of the end of the search sequence, namely the performance of three complete search sequences according to the three emission configurations in order to check whether all the tags have been inhibited.

Figure 5:
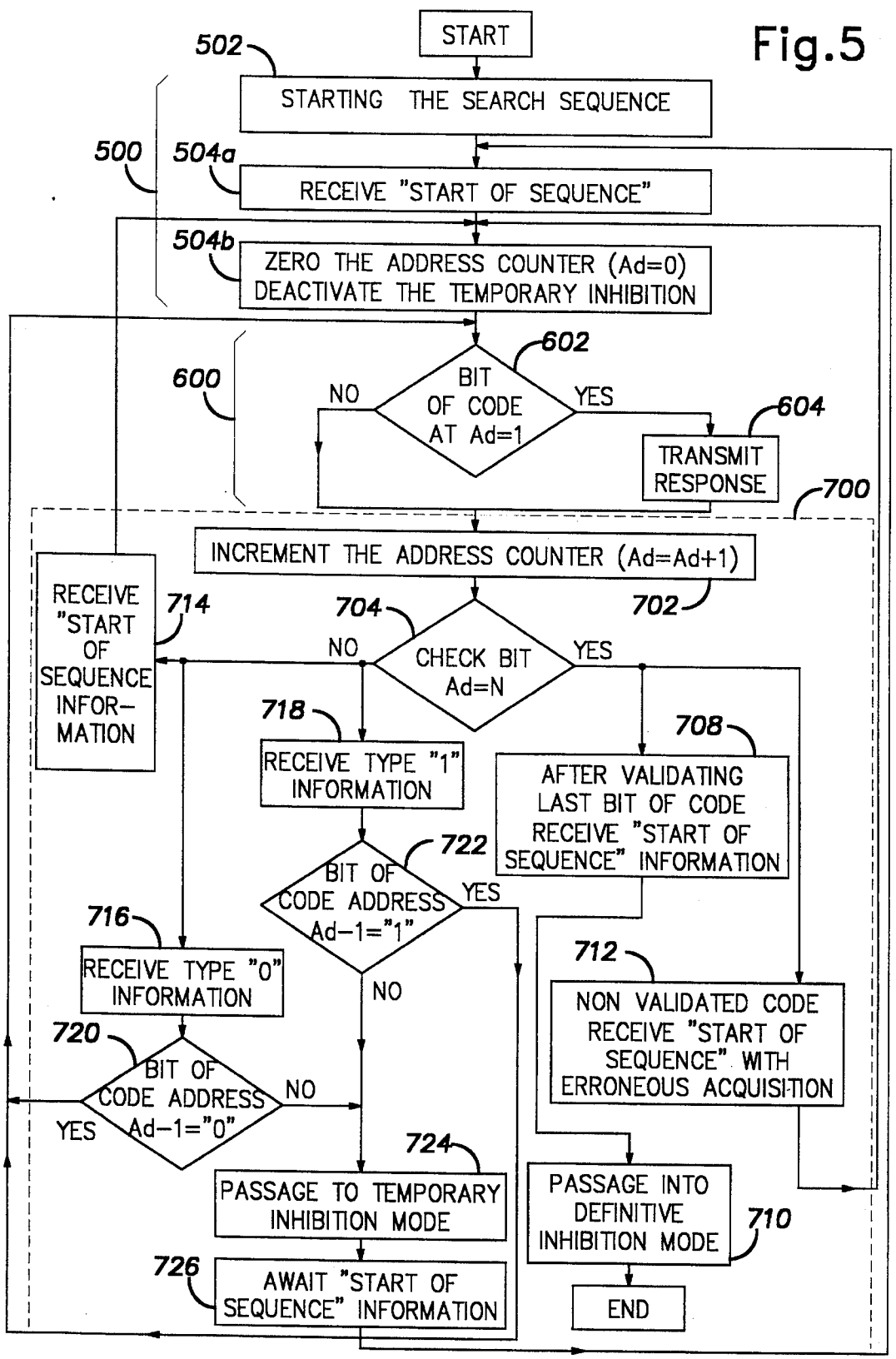
FIG. 5 shows the stages performed by the checking and sequencing circuit of the tag according to the invention.

FIG. 5 shows the different stages performed by the checking and sequencing circuit 20 on each tag.

A first stage 500 consists of starting 502 the search sequence on energizing the tag and the reception 504$a$ of the "start of search sequence" signal and the zeroing of the address counter in 504$b$. A second stage 600 consists of choosing 602 the bit of information of the code at address Ad to be emitted 604 in response to the interrogation 602 from the gate.

A third stage 700 consists of checking 704 which bit of the code is being processed. The address counter Ad is incremented 702, Ad=Ad+1. At the end of the processing in 704 of the last bit of the code, if the processed code has been validated by the gate, the tag receives 708 from the gate a start of sequence information with passage 710 into the definitive inhibiting mode of the processed tag, in order to permit the interrogation of the other tags. If the processed code is not validated by the gate, the tag receives 712 from the gate a start of sequence information with erroneous acquisition, which brings about a return to stage 504b.

When the processed bit is not the final bit of the code, the tag receives a type 1 information 718 emitted by the gate if the latter has detected an answer 604 of at least one tag during the interrogation of the address (Ad–1), or a type 0 information 716 emitted by the gate, if the latter has detected no answer during the interrogation of the address (Ad–1). If the information received here is neither of type 1, nor of type 0, but a start of sequence information 714 as a result of a transmission fault, there is a return to stage 504b in order to reinitialize the interrogation.

If the code bit at the previously processed address (Ad–1) does not contain the information of the received type 720, 722, the tag is temporarily inhibited 724 up to the reception of a start of sequence information 504a. In the opposite coarse, there is a return to stage 600, where the tag transmits an answer in the form of a signal when the code bit at the processed address Ad contains a 1 does not transmit a signal in the opposite case.

On the attached table, FIGS. 6A, 6B and 6C, is shown the gate/tag dialog in an example of three tags E1, E2 and E3 with a respective code having five elements 01100, 01010 and 00111, the first bit, e.g. being the left-hand bit. The gate electronic circuit modulator 2a generates two wave shapes. The combination of these two wave shapes makes it possible to define four information types. In the considered example, the informations 00, 01, 10, and 11 respectively signify, as stated hereinbefore, "start of search sequence", "type 0 information" indicating that the bit processed during the preceding interrogation is not equal to 1 for any active tag, "type 0 information" indicating that the bit processed during the preceding interrogation is not equal to 1 for any active tag, "type 1 information" indicating that at least one tag processed during the preceding interrogation has its bit at 1, and "start of search sequence with erroneous preceding code".

The gate emits a given information signal in the first column of the attached table. The tags reply to this signal by a binary answer meaning yes or no, i.e. the tags transmit a signal for yes or transmit no signal for no. The interpretation of each gate/tag exchange is given in the final column of the table.

In a more practical manner and with a view to detecting the presence of transmission errors and possibly for correcting these errors, it is possible to add correction bits to the bits defining the tag code.

The tags associated with such a gate can be of different types, i.e. can have different electronics for "conversing" with the gate. For example, said tags can have an E/R device able on the one hand to respond, on a frequency F/k (k being a prime number) to the signals transmitted by the gate on a frequency F, and on the other hand, can be inhibited when its code has been found by the gate in order to permit the search for other codes.

Apart from the advantages described hereinbefore, in the special case of an application to the sale of goods in a large area, the invention enables customers to record the chosen articles. Therefore the invention avoids waiting in long lines at the checkouts, where the cashier has to identify each article individually. Clearly this application has only been given in an illustrative manner. The invention is applicable to numerous other fields for the identification of a person or an object.

We claim:

1. System for the automatic identification of objects or persons by remote interrogation comprising interrogating E/R (emitter/receiver) means adapted to continuously emit a radio frequency signal and answering E/R means associated with each of the objects or persons, said answering E/R means comprising:

a reception and emission circuit (12, 18) adapted to receive radio frequency signals carrying coded information from the interrogating E/R means, adapted to emit radio frequency signals carrying an answer, and including at least one emitting/receiving antenna (18), an energizing device (16), and storage means in which is stored a digitized code linked with the respective object or person;

said interrogating E/R means comprising:

a device (2b, 4) for emitting the radio frequency signals carrying the coded information, a device (4, 6) for receiving the radio frequency signals carrying the answer from the answering E/R means, and a modulator (2a) generating different wave shapes to be emitted in the radio frequency signals carrying the coded information, processing means adapted to control a search of the digitized code that is transmitted in the answer by the answering E/R means, and a memory adapted to store digitized codes received in the answer, characterized in that the answering E/R means also comprise:

a checking and sequencing circuit (20) adapted to control answer signals that answer the coded information signals transmitted by the interrogating E/R means, a code search sequence being defined by the signals exchanged between the interrogating E/R means and the answering E/R means for determining if a code received by the interrogating E/R means is a code being searched for by the processing means, and inhibiting means (26) connected to said checking and sequencing circuit and adapted to either temporarily inhibit or definitively inhibit the answering E/R means responsive to the interrogating E/R means, said inhibiting means incorporating at least first and second flip-flops, the first flip-flop (26a) being a temporary inhibiting flip-flop adapted to temporarily inhibit the answering E/R means during the search sequence when the answering E/R means determines that the digitized code being searched for is not the code stored in its storage means and the second flip-flop (26b) being a definitive inhibiting flip-flop ensuring definitive inhibition of the answering E/R means when the digitized code being searched for has been correctly received and stored by the interrogating E/R means.

2. Identification system according to claim 1, characterized in that the digitized code comprises at least one of a code identifying a "type" of object or person, a random subcode ensuring unitary identification of the object or person and a check code for checking the integrity of the transmitted information.

3. Identification system according to either of the claims 1 or 2, characterized in that the storage means of the answering E/R means comprises a code memory (24) and an address counter (22) adapted to indicate each element of a digitized code stored in the storage means; said counter having a clock input connected to a clock signal of the checking and sequencing circuit controlling the advance of the counter and a reset input connected to a zeroing output of the checking and sequencing circuit for indicating a first element of the digitized code.

4. Identification system according to either of the claims 1 or 2, characterized in that the modulator of the interrogating E/R means generates at least two wave shapes combined together to form at least four "types" of the coded information emitted from the interrogating E/R means.

5. Identification system according to either of the claims 1 or 2, characterized in that the energizing device comprises a circuit for the recovery of energy carried by the radio frequency signals received from the interrogating E/R means.

6. Identification system according to either of the claims 1 or 2, characterized in that the processing means of the interrogating E/R means is adapted for controlling the search of the digitized codes according to the following stages:

a) transmitting a "start of search sequence" pulse corresponding to interrogation of a first element of the digitized code, b) awaiting an answer from the answering E/R means, c) storing in the memory of the interrogating E/R means a logic state corresponding to the element of the digitized code being interrogated and transmitting "type" information corresponding to the answer received in order to interrogate a next code element, d) returning to stage b) and continuing until an end of the search sequence when a final code element is identified, e) verifying validity of the digitized code received, f) storing in said memory the digitized code received when said received code is valid and rejecting said digitized code in the opposite case with the transmission of a "sequence start and erroneous preceding code" information and returning to stage b) when the code is rejected, and g) returning to stage a) when the received code is valid in order to interrogate other codes until a zero code is obtained.

7. Identification system according to claim 6, characterized in that the answering E/R means is in an activity state being one of an active state and an inhibited state and the checking and sequencing circuit of the answering E/R means is adapted to perform the following stages:

a) receiving the "start of search sequence" pulse transmitted by the interrogating E/R means, b) zeroing an address counter of the storage means of the answering E/R means, c) temporarily inhibiting the answering E/R means until the: reception of the next coded information coming from the interrogating E/R means, depending on the activity state of the answering E/R means, a logic state of the code element being interrogated and the "type" of the last information received from the interrogating E/R means, d) incrementing an address of the address counter of the code storage means, checking the address, and passing to stage g) of claim 7 when said address corresponds to the final element of the interrogated code, e) receiving the "type" of the last information transmitted in stage c) of claim 7 by the interrogating means corresponding to the answer emitted by the answering E/R means or receiving a "start of search sequence" pulse, f) temporarily inhibiting the answering E/R means until the reception of a "start of search sequence" pulse coming from the interrogating E/R means in the case when the last information received in c) of claim 7 from the interrogating E/R means is different from the information stored at the corresponding address in the storage means of the answering E/R means or, in the opposite case, returning to stage c) of claim 7, g) definitively inhibiting the answering E/R means when the final element of the digitized code has been correctly transmitted by the answering E/R means or reactivating said answering E/R means and returning to stage b) of claim 7 in the opposite case.

8. Identification system according to either of the claims 1 or 2, characterized in that the digitized codes consist of strings of bits.

9. Identification system according to either of the claims 1 or 2, characterized in that the interrogating E/R means comprise at least three emitting antennas (4A$a$, 4B$a$, 4C$a$) each connected downstream of an emitter (2$b$A, 2$b$B, 2$b$C), said antennas operating in pairs, and at least three receiving antennas (4A$b$, 4B$b$, 4C$b$) each connected to a receiver (6$a$A, 6$a$B, 6$a$C) and to a demodulator (6$b$A, 6$b$B, 6$b$C) downstream of which a decision member (6$c$) generates a detection signal when a signal is received by at least one of the antennas.

10. Identification system according to claim 9, characterized in that the processing means of the interrogating E/R means is adapted for controlling the search of the digitized codes according to the following stages:

choosing an emission configuration by choosing a combination of the emitting antennas to be used during operation of the identification system, changing the emission configuration and resuming the search sequence when the digitized code has not been correctly transmitted by the answering the E/R means, storing the digitized code when said code has been determined to be erroneous for at least three different emission configurations, and successively performing the search sequence using different emission configuration in order to check the definitive inhibition of the answering E/R means.

* * * * *

UNITED STATES PATENT AND TRADEMARK OFFICE
CERTIFICATE OF CORRECTION

PATENT NO. : 5,528,221
DATED : June 18, 1996
INVENTOR(S) : Jeuch et al.

It is certified that error appears in the above-indentified patent and that said Letters Patent is hereby corrected as shown below:

Column 4, line 63, after "by" insert --a--.

Column 6, line 33, delete "Then" and insert --When--; and line 60, delete "602".

Column 7, line 19, delete "coarse" and insert --case--;

line 21, after "1" insert --or--;

line 30, delete "informations" and insert --information--.

Column 9, line 52 (Claim 7, line 11), delete "the:" and insert --the--.

Column 10, line 52 (Claim 10, line 15) delete "configuration" and insert --configurations--.

Signed and Sealed this

Twenty-first Day of January, 1997

Attest:

BRUCE LEHMAN

*Attesting Officer*      *Commissioner of Patents and Trademarks*